3,197,325
BASE COAT FOR WOOD FLOOR FINISHES
Robert Milton Hick, Jr., Springfield, and Andrew Weste Riedell, Jr., Drexel Hill, Pa., assignors to E. I. du Pont de Nemours and Company, Wilmington, Del., a corporation of Delaware
No Drawing. Filed Apr. 2, 1962, Ser. No. 184,567
12 Claims. (Cl. 117—73)

This invention relates to a nitrocellulose-modified vinyl acetate polymer coating composition adapted for use primarily as a basecoat for serviceable wood floor finishes. More particularly, the invention relates to a basecoat sealer composition having a mixture of a preponderant proportion of vinyl acetate polymer and a minor proportion of nitrocellulose as the essential organic film-forming components thereof and to a serviceable finished wood substrate, e.g., a bowling lane, having a composite finish on the surface thereof comprising the modified vinyl acetate polymer basecoat and a plurality of coats of topcoat lacquer superimposed over the basecoat.

Playing lanes of a bowling establishment are fabricated of wood blocks and the playing surface is provided with a serviceable finish which is periodically dressed with oil, e.g., mineral oil. During application of the oil and subsequent play some of the oil migrates to the wood substrate, although a major proportion of the oil is picked up by the bowling balls. The lanes are also seasonally refinished, as the need dictates, because of deterioration of the finish under repeated impact of the balls on the lanes during play.

One of the problems of finishing or refinishing the lanes is to provide adequate holdout and, in the case of refinishing, to provide adequate sealing against any oil which may have migrated to the wood substrate. Presence of the migratory oil ordinarily causes inferior adhesion of the lacquer topcoats. When the basecoat penetrates the interstices of the wood substrate rather than sealing the wood with a holdout surface layer, the lanes are prone to exhibit cracking of the wood, particularly in the areas adjacent to the joints of the wood blocks in the lanes.

The primary objective of this invention is to provide a basecoat composition which remedies these aforementioned undesirable defects and, more particularly, to provide a basecoat composition which when applied to bowling lanes exhibits holdout characteristics which eliminates starved appearance of the finish, and sealing properties in reference to inhibiting migration of oil dressing from the wood, such migration ordinarily interfering with topcoat adhesion.

These and other objectives hereinafter disclosed are accomplished by blending together polyvinyl acetate, in a preponderant proportion, and an effective small proportion of nitrocellulose in solution in a balanced volatile organic liquid diluent composition comprising at least one mutual solvent for the polyvinyl acetate and the nitrocellulose, and at least one non-solvent for the nitrocellulose comprising a hydrocarbon, the composition of the diluent being balanced with active solvent characterized by a relatively fast evaporation rate and non-solvent characterized by an evaporation rate significantly slower than that of the active solvent. The resulting more rapid loss of active solvent relative to loss of non-solvent produces a rapid decline in solvency of the diluent for the nitrocellulose and thereby causes the nitrocellulose to gel prior to gelation of the polyvinyl acetate in the drying of the basecoat by volatile loss of the diluent therefrom. This basecoat is applied at ordinary coating weight to the bowling lane which may be of new wood or wood reconditioned for refinishing. This coating is dried at ambient temperature, ordinarily in the range of 55° F. to 85° F., by volatile loss of the diluent therefrom and a plurality of coats of topcoat lacquer composition are superimposed over the basecoat and dried at ambient temperature.

For usual techniques of applying coating compositions, the basecoat composition is formulated ordinarily with a content of non-volatile film-forming components in the range of from about 12% to about 25% by weight of the composition, the sum of the percentages of nitrocellulose and polyvinyl acetate rarely being greater than 30%. Although some useful compositions may contain less than 12% of the film-forming components, e.g., about 8% or 10%, such low concentrations usually require application of a plurality of coats of basecoat composition to be effective. Preferably, the application viscosity of the basecoat composition is from about 15" to about 50" at 25° C. using the Ford #4 cup.

Nitrocellulose is present in the relative proportions of from about 4 parts to about 20 parts per 100 parts of the polyvinyl acetate. Preferably, within these proportions, nitrocellulose is present at a concentration in the range of 0.7% to 3% based on the total weight of the composition. Useful nitrocellulose is characterized by a viscosity usually in the range of from about ½ second to about 500 seconds, preferably up to about 100 seconds. Higher viscosity nitrocellulose, e.g., up to about 2000 seconds may be blended with lower viscosity nitrocellulose, e.g., ½ second to 5 seconds, to provide intermediate viscosities within the preferred range. The viscosity of the nitrocellulose is expressed in terms of the standard procedure described in ASTM-D-301-56 using Solution Formula A for viscosities higher than 6 seconds and Solution Formula B for viscosities up to 6 seconds. Commercial ½ second nitrocellulose is generally recognized as having a viscosity of 3 to 4 seconds using Solution Formula B. The nitrocellulose is further characterized as being the ordinary lacquer grade having a nitrogen content in the range of from about 11.7% to about 12.2%.

Vinyl acetate polymers useful in combination with the described nitrocellulose are characterized by a viscosity in the range of from about 5 to 150 centipoises, preferably 7 to 50 centipoises, based on a benzene solution of 86 grams of the polymer per 1000 ml. of solution at 20° C., i.e., about 9.6% solution, using the method described in ASTM-D-445-46T. The terms "polyvinyl acetate" and "vinyl acetate polymers" as used throughout the specification and claims define homopolymers of vinyl acetate and partially hydrolyzed polymers of vinyl acetate having the acetate moiety partially replaced with hydroxyl in a proportion up to 20% of the polymer being calculated equivalently as polyvinyl alcohol, i.e., the polymer is at least 80% polyvinyl acetate.

Useful active solvents for the polyvinyl acetate and the nitrocellulose having a high rate of volatilization include acetone, methyl ethyl ketone, diethyl ketone, methyl isobutyl ketone, methyl acetate, ethyl acetate, isopropyl acetate, and propyl acetate. These active solvents are characterized by a rate of evaporation greater than that of toluol. Methyl ethyl ketone and other solvents or mixtures of active solvents characterized by solvency and evaporation rate substantially equivalent to that of methyl ethyl ketone are especially preferred as the fast evaporating active solvent component. Relatively slower evaporating active solvents which at least exhibit solvency for the polyvinyl acetate, e.g., methyl n.amyl ketone, methyl isoamyl ketone, cyclohexanone, isobutyl acetate, n.butyl acetate and other active solvents characterized by an evaporation rate comparable with that of the non-solvent hydrocarbon components, i.e., having an evaporation rate no slower substantially than that of industrial 10° xylol, can supplement the described fast evaporating active solvents in minor proportions relative to the total content of active solvent. The weight ratio of the slower evaporating active solvent is usually no greater than approximately 25 parts per 100 parts of the total amount of active solvent and preferably no greater than approximately 50 parts per 100 parts of the non-solvent hydrocarbon. The proportion of total active solvent is in the range of from about 50 parts to about 80 parts based on 100 parts by weight of the balanced diluent composition, including at least 50 parts of the fast evaporating solvent.

Useful non-solvent hydrocarbons include toluol, xylol, industrial 10° xylol and high solvency petroleum naphthas which are recognized toluol and xylol substitutes in the coating art. These petroleum naphthas having a high aromatic content are characterized by a boiling range which is significantly wider than that ordinarily specified for toluol and industrial xylol. These aromatic petroleum naphthas usually have a boiling range within the limits of 90° C. to 150° C., at least 90% of the hydrocarbon distilling at a temperature up to 145° C. There are numerous commercial sources of these petroleum naphthas recognized as toluol and xylol substitute hydrocarbons. The non-solvent hydrocarbon components are present in the proportion of 20 to 40 parts, preferably up to 35 parts, per 100 parts by weight of the balanced diluent composition. The weight ratio of the non-solvent hydrocarbon to the total active solvent is in the range of from about 0.25 to about 0.8. Particularly preferred hydrocarbon components are those which are characterized by an evaporation rate comparable with that of 100 parts of a mixture of 20 to 40 parts of toluol and 80 to 60 parts of industrial 10° xylol.

The balanced diluent ordinarily further includes a $C_1$ to $C_4$ alkanol, a portion of which is introduced in the form of dehydrated alcohol wetting the nitrocellulose. The alkanol ordinarily constitutes 0.3 to 25 parts of the balanced diluent composition and preferably is present in a proportion of 5 to 20 parts of a $C_2$ to $C_4$ alkanol. Commercial alcohol wet nitrocellulose ordinarily contains 65% to 75% of dry wet nitrocellulose and complementally 35% to 25% of the dehydration alcohol which usually is a $C_2$ to $C_4$ alkanol plus water, the alcohol concentration usually being at least 30% of the alkanol. Such wetting dehydration alcohol will ordinarily contribute at least about 0.3 part of alkanol to the composition.

Alkanols introduced per se, active solvents and non-solvents making up the composition of the balanced diluent are characterized as being commercially dry. Except for the alkanols, the active solvent and non-solvent components of the diluent are ordinarily at least 19:1 dry as measured by the technique of ASTM–D–268–46. The alkanols may be anhydrous or they may contain ordinary amounts of water, e.g., 95% ethyl alcohol and 95% isopropyl alcohol.

The balanced diluent composition, in summarizing, will ordinarily have the following composition per 100 parts by weight thereof:

|  | Useful | Preferred |
| --- | --- | --- |
| (a) Fast evaporating active solvent | At least 50 | 50 to 75. |
| (b) Slower evaporating active solvent | 0 to 20 | 0 to 10. |
| (c) $C_1$ to $C_4$ alkanol | 0.3 to 25 | 5 to 20. |
| (d) Non-solvent hydrocarbon of high aromatic content. | 20 to 40 | 20 to 35. |

While the basecoat composition may consist simply of the combination of polyvinyl acetate and nitrocellulose in solution in the balanced diluent, it is advantageous to include a polyorganosiloxane having pendant groups selected from methyl and phenyl, preferably polydimethylsiloxane, in the basecoat formulation. Useful proportions of the polyorganosiloxane usually range from about 100 parts to about 1500 parts, preferably 200 to 1000 parts, of the polyorganosiloxane per million parts of organic film-forming components of the basecoat. This same proportion of the polyorganosiloxane may be present advantageously in the topcoat composition. In addition to providing the respective basecoat and topcoats with improved surface characteristics, the polyorganosiloxane in the basecoat enhances the sealing action. Useful species of the polyorganosiloxane are fluid polymers having a viscosity ordinarily in the range of 10 to 100,000 centistokes, preferably from about 20 to about 300 centistokes. These fluid polyorganosiloxanes are commercially available under the designations of silicone oils and silicone fluids, e.g., DC–200 series silicone fluids which are polydimethyl siloxanes further designated by the centistoke viscosity and DC–550 silicone fluid which is a representative phenylsiloxane-dimethylsiloxane copolymer.

The basecoat may contain pigments, dyes, lakes or other compatible coloring material ordinarily used in lacquer formulations in tinting proportions which do not contribute significant hiding power to the basecoat, but usually the basecoat composition is untinted and in that state provides a substantially water-white clear coating. Topcoats may likewise be tinted.

Any of the nitrocellulose lacquer compositions which are formulated as a serviceable wood floor finish, or more particularly as a bowling lane topcoat finish can be superimposed over the described novel basecoat to provide the serviceable composite finish. The organic film-forming components of useful topcoat lacquers ordinarily consist essentially of ¼ to ¾ second viscosity lacquer grade nitrocellulose and a plasticizer therefor consisting essentially of a non-drying oil fatty acid ester in suitable plasticizing proportions.

The plasticizer can be a simple ester of the fatty monocarboxylic acid with a monofunctional esterifying reactant or the plasticizer can be a polyester having the fatty acid as a modifier thereof. Simple esters of castor oil acids, i.e., ricinoleic acid, and castor oil or castor oil acids modified polyesters, e.g., castor oil modified glyceryl phthalate alkyd resins and castor oil modified polyester of ethylene glycol and sebacic acid ("Paraplex" RG–2) are usually preferred plasticizers. Simple plasticizing esters, e.g., lower alkanol esters of ricinoleic acid having the hydroxyl thereof acetylated, are preferably used in the proportion of 20 to 35 parts per 100 parts of the nitrocellulose. With the fatty acid modified polyesters and alkyd resins in which the plasticizing contribution of the ricinoleic acid or other fatty acids is significantly less than in the simple ester plasticizers, the relative proportion of the plasticizing polyester or alkyd resin is usually substantially greater, e.g., up to about 150 parts per 100 parts of the nitrocellulose. Butyl acetyl ricinoleate, commercially available as "Flexricin," characterized by a saponification value of 270 to 290, an acid number of up to 3, and an iodine value (ASTM–D–555–47) of 65 to 70, is representative of especially preferred plasticizers.

The nitrocellulose and the plasticizer therefor are in solution in a volatile liquid vehicle consisting essentially of a solvent for the nitrocellulose and a non-solvent for the nitrocellulose comprising a hydrocarbon having a high aromatic equivalency. The same non-solvent hydrocarbons specified for the basecoat formulation can be used in the topcoat formulation. The volatile liquid vehicle of the topcoat formulation does not require the significant balance of evaporation rate and solvency that is essential to the basecoat formulation. Preferably the active solvent in the topcoat is characterized by an evaporation rate ranging from that comparable with an equal mixture of methyl isobutyl ketone and methyl ethyl ketone to that comparable with butyl acetate, and the non-solvent is characterized by an evaporation rate preferably ranging from that of toluol to that of industrial 10° xylol. The relative proportions of the active solvent and non-solvent are such that the concentration of organic film-forming material and the viscosity are at desired levels for application by the usual techniques. The concentration of film-forming material ordinarily is in the range of 10% to 28% of the topcoat formulation. The viscosity at ordinary application consistency, usually is in the range of 15 to 50 seconds at 25° C. using the Ford #4 cup.

The topcoat composition is superimposed over the basecoat in a plurality of coats, i.e., at least two coats and usually 3 to 5 coats, to provide the composite finish on the bowling lane. The resulting topcoat layer usually is at a dry coating thickness ranging from about 1.5 to about 4 times the basecoat thickness. The respective coats of topcoat formulation making up the topcoat layer are dried at ambient temperature ranging ordinarily from about 55° F. to about 85° F.

EXAMPLE 1

Basecoat formulation:                          Parts by weight
First portion—
    Toluol _____ 50
    Methyl ethyl ketone _____ 464
    95% ethyl alcohol 23A denatured _____ 133
    polyvinyl acetate—15 c.p.s. _____ 164
Second portion—
    Nitrocellulose—½ second _____ 27
    Ethyl alcohol wettage of the nitrocellulose__ 12
Third portion—
    Xylol—industrial 10° _____ 145
    Polyorganosiloxane solution—2% in xylol _____ 5
                                                 ————
                                                 1000

The 23A denatured alcohol consists of 100 gallons of 95% ethanol and 10 gallons of acetone denatured according to the Government formula 23A.

The polyvinyl acetate is characterized by a viscosity of about 15 centipoises based on a 9.6% solution in benzene.

The nitrocellulose is regular lacquer grade having a viscosity of about ½ second, i.e., having a viscosity of 3 to 4 seconds in the ASTM-D-301-56 Solution Formula B.

The industrial 10° xylol is characterized by a boiling range of 135° C. to 145° C. and an aniline point of —44° C.

The polyorganosiloxane solution consists of 2% of fluid polydimethylsiloxane characterized by a viscosity of about 100 centistokes, the solvent being industrial xylol.

The ingredients of the first portion are blended together until the polyvinyl acetate is in solution, then the alcohol wet nitrocellulose of the second portion is blended into the resulting solution of the first portion until it is in solution, and then the ingredients of the third portion are blended into the solution of the combined first and second portions. Alternatively, the composition can be prepared by mixing all the ingredients together until the polyvinyl acetate and nitrocellulose are in solution, or the nitrocellulose and the polyvinyl acetate can be dissolved separately as preformed solutions and the resulting solutions blended until uniform.

The resulting basecoat composition is characterized by an organic film-forming content consisting of 16.4% of polyvinyl acetate, 2.7% nitrocellulose, and polydimethylsiloxane in the proportion of about 500 parts of the polyorgano siloxane per million parts of total weight of the polyvinyl acetate and the nitrocellulose. The viscosity of the composition is about 32 seconds at 25° C. using a Ford #4 cup.

EXAMPLE 2a

Basecoat formulation:                          Parts by weight
    Polyvinyl acetate—7 centipoises _____ 200
    Nitrocellulose—49 seconds _____ 10
    Isopropyl alcohol wettage of the nitrocellulose__ 4
    Toluol _____ 50
    Xylol—industrial 10° _____ 150
    95% ethyl alcohol 23A denatured _____ 133
    Methyl ethyl ketone _____ 453
                                                   ————
                                                   1000

The nitrocellulose viscosity is based on ASTM-D-301-56 Solution Formula A. The organic film-forming materials are initially slurried with non-solvent components, then the methyl ethyl ketone active solvent is added to the slurry to solubilize the film-forming materials, and mixing is continued until a uniform solution is obtained. The resulting basecoat composition is characterized by a film-forming solids content of 20% polyvinyl acetate plus 1% of nitrocellulose, and by a solution viscosity of about 33 seconds at 25° C. using a Ford # 4 cup.

EXAMPLE 2b

The basecoat composition of Example 2a is modified by blending 0.5 part of a 2% solution in xylol of 20 centistokes polydimethylsiloxane per 100 parts by weight of the Example 2 composition. This amount of the silicone solution provides about 500 parts of polydimethylsiloxane per million parts of the film-forming material. The solution viscosity of this silicone-modified basecoat composition is the same as that of the Example 2a composition.

*Topcoat Coating Composition A*

One hundred parts by weight of a typical topcoat formulation for finishing bowling lanes consists essentially of about 17.5 parts of alcohol wet ½ second lacquer grade nitrocellulose having an alcoholic volatile content of 30%, i.e., 70% nitrocellulose content, and fatty acid ester plasticizer, e.g., lower alkyl acetyl ricinoleate such as the butyl ester, in the proportion of about 27 parts per 100 parts of dry weight nitrocellulose. These film-forming components are in solution in a solvent/diluent mixture consisting essentially of methyl isobutyl ketone and industrial 10° xylol in about equal proportions by weight making up the balance of the composition.

Topcoat Coating Composition B is a modification of Topcoat Coating Composition A into which is blended, per 100 parts thereof, 0.5 part of a 2% solution of the polyorganosiloxane fluid in xylol, thus providing about 650 parts of the polyorganosiloxane per million parts of the organic film-forming components.

*Comparative Basecoat Composition C*

A typical commerical basecoating composition C for bowling lanes consists essentially of a solution of about 16 parts of low viscosity vinyl acetate polymer in about 84 parts of a solvent/diluent mixture consisting essentially, per 100 parts thereof, of about 50 parts of butyl acetate, about 30 parts of ethyl alcohol and about 20 parts of industrial 10° xylol. The vinyl acetate polymer has a content of 80% to 100% vinyl acetate and may be partially hydrolyzed to a hydroxyl content equivalent up to about 20% of the polymer being analytically calculated as polyvinyl alcohol, and is further characterized as having a viscosity in the range of 5 to 15 centipoises based on the aforementioned test solution.

*Comparative Basecoat D*

Same as Comparative Basecoat Composition C with 0.01% of fluid polydimethylsiloxane blended therein.

Specimen bowling lane sections are assembled from combinations of maple and yellow pine blocks used ordinarily in the fabrication of bowling lanes. In the length of the playing surface of the bowling lane, a mid-section of the lane, where ordinarily the bowling ball simply rolls over the playing surface, is fabricated of pine blocks. The starting end section and the pin section, where the surface is subject to considerable abuse by impact, are fabricated of maple blocks. A specimen section is marked off into unit areas including both types of wood blocks in each area. One area is coated with a single coat of the basecoat composition of Example 1 and a second area is coated with a single coat of the Comparative Basecoat Composition C, the coating weight in each case being about one gallon per lane area of 63 feet by 3.5 feet. The respective basecoats are dried at room temperature of about 75° F. Three coats of the Topcoat Composition A are superimposed over the respective dry basecoats and dried overnight. The composite finish having the Example 1 basecoat exhibits holdout and fullness. There is no significant difference between the hard maple blocks and the pine blocks which are comparatively soft and porous. The composite finish having comparative basecoat exhibits poor holdout over the pine blocks, i.e., the finish has a hungry appearance over the porous pine blocks. Even over the maple blocks, the comparative basecoat does not provide fullness equal to that which is provided by the Example 1 basecoat. Although the coating weights over the respective areas are substantially equal, the area having the composite finish including the Example 1 basecoat appears to have a significantly greater coating weight applied thereon comparatively.

Another specimen section is prepared and marked off into three unit areas. One area is coated with a single coat of the basecoat composition of Example 2a, a second area is coated with a single coat of the Comparative Basecoat Composition D, and a third area is coated with a single coat of the basecoat composition of Example 2b. These basecoats are applied at equal coating weights and the respective basecoats are dried at room temperature of about 75° F. The basecoated specimen section is marked off into two halves, each including portions of all three basecoat areas. Three coats of Topcoat Composition A are applied over one half and three coats of Topcoat Composition B are applied over the second half. These respective topcoats are dried overnight at ordinary room temperature.

Of the resulting six areas having different composite finishes, the two areas having the comparative basecoat exhibit inadequate holdout over the pine blocks, with fullness over the maple blocks being rated 5th and 6th in the series. The composite finish having the polyorganosiloxane both in the comparative basecoat and in the topcoat layer is rated 5th versus 6th for the composite finish having the polyorganosiloxane only in the comparative basecoat and not in the superimposed topcoat layer. The remaining four composite finishes all representing the invention, exhibit excellent holdout over the pine blocks, and fullness over the maple blocks which is comparatively better than that of the composite finishes including the Comparative Baseboard D. The two composite finishes representing the topcoat containing polyorganosiloxane over the invention basecoat compositions with or without polyorganosiloxane therein are rated about equal in appearance and as best. The two composite finishes having no polysiloxane in the respective topcoat layers applied over the invention basecoats with and without polyorganosiloxane in the basecoat are approximately equal in appearance and are rated second best. However, of these two, the composite finish which includes the polyorganosiloxane in the basecoat exhibits a slight advantage.

Another specimen section is prepared and marked off into two halves. One half is soaked with oil dressing of the type ordinarily supplied for conditioning bowling lanes and is wiped free of excess. The specimen is then marked off into three unit areas each including half which is oil-treated and half untreated. One area is coated with one coat of the basecoat of Example 1, a second area is coated with one coat of the basecoat of Example 2a, and a third area is coated with one coat of the Comparative Basecoat C. After the respective basecoats are dry, the entire surface of the basecoated specimen is coated with four coats of Topcoat Composition A which are dried at room temperature. The resulting composite finishes which respectively include the Example 1 basecoat and the Example 2a basecoat exhibit no significant difference between the oil-treated half and the untreated half of the wood substrate, indicating that these basecoats adequately seal in the oil dressing absorbed by the wood. In comparison, the composite finish which includes the Comparative Basecoat C exhibits degradation of intercoat adhesion between the comparative basecoat and the superimposed topcoat layer as a result of migration of the oil dressing, i.e., the comparative basecoat does not adequately seal in the oil dressing. The comparative composite finish over the untreated half of the area exhibits intercoat adhesion comparable with that of composite finishes which respectively include the invention basecoats.

Still another specimen section is prepared and marked off into three unit areas. One area is coated with one coat of the Example 1 basecoat, a second area is coated with one coat of the Example 2a basecoat, and a third area is coated with one coat of the Comparative Basecoat C. After these basecoats have dried overnight to insure complete dryness, the basecoated substrate is marked in half, each half including three areas coated with the respective basecoats. One half is soaked with oil dressing and the excess is wiped off. The remaining half is untreated. Four coats of Topcoat Composition A are applied over the entire basecoated surface of the specimen and dried at room temperature. Of the resulting six test areas, five areas exhibit good intercoat adhesion between the topcoat layer and the respective basecoats. Only the area representing the topcoat layer over the comparative basecoat post-treated with oil dressing exhibits degradation of intercoat adhesion. The comparative basecoat permits migration of the oil dressing into the wood substrate from which it is again free to spew to the surface. In comparison, the invention basecoats seal out the oil dressing and when these basecoats are wiped free of excess oil dressing, any residual oil dressing remaining with the invention basecoats is insufficient to produce a significant degradation of intercoat adhesion between the topcoat layer and these basecoats representative of the invention.

In another series of tests, two specimen sections are fabricated from maple blocks. One half of each specimen is coated with one coat of the Comparative Basecoat C, one of the remaining halves is coated with one coat of Example 1 basecoat and the second is coated with one coat of Example 2b basecoat. Four coats of Topcoat A are superimposed over the basecoated specimens and dried. These specimens representing three differently coated test areas are subjected to ball bump tests simulating impact between the ball and the bowling lane. The surfaces of the test specimens exhibit apparently comparable service. However, on closer examination of the coated substrate areas adjacent to the joints in the maple substrate, the area coated with the composite finish which includes the comparative basecoat exhibits minute cracking of the wood beneath the coating. The respective areas coated with the composite finishes, including the respective basecoats of this invention, exhibit significant improvement in resistance to cracking of the wood adjacent to the joints. In this regard, the composite finish including the basecoat of Example 1, exhibits an advantage over the composite finish including the basecoat of Example 2b. This advantage is attributed to the polyvinyl acetate of relatively higher viscosity used in the Example 1 basecoat formulation.

In actual field tests, bowling lanes used in regular play are refinished respectively with composite finishes representing the following combinations:

(I) Ordinary comparative bowling lane finish having four coats of Topcoat Composition A applied over one coat of Comparative Basecoat C.
(II) Comparative bowling lane finish having four coats of Topcoat Composition B applied over one coat of Comparative Basecoat D.
(III) Composite finish of four coats of Topcoat Composition B applied over one coat of Example 1 basecoat
(IV) Composite finish of four coats of Topcoat Composition B applied over one coat of Example 2a basecoat.
(V) Composite finish of four coats of Topcoat Composition A applied over one coat of Example 2b basecoat.

The bowling lanes are prepared for refinishing by the usual techniques. The respective basecoats and topcoats are each applied at a coating weight of approximately equivalent to one gallon per lane and drying is at ordinary room temperature.

Comparative examination of the refinished bowling lanes confirms the advantages of the invention basecoats observed with the specimen sections. Over the pine wood section of the lanes, the composite finish III, IV and V exhibit distinctly better fullness than the comparative composite finishes I and II. At completion basecoating in the refinish operation, I and II exhibit little holdout in comparison with III, IV and V. Over the maple wood starting and pin sections of the lanes, all five composite finishes are comparable in appearance with finish III being rated 1 and comparative finish I being rated 5 on a numerical scale of 1 to 5 wherein 1 represents the best. The other three are rated about equal in appearance.

In regular play, bowling lanes having comparative composite finishes I and II exhibit initiation of topcoat delamination failure in about one month with this deficiency becoming progressively worse to necessitate refinishing in less than six months. Lanes having the composite finishes III, IV and V exhibit no significant defects during one month of regular play and are still free of delamination after six months of play. Thus these composite finishes which include the invention basecoat as defined provide a significant extension of the service life of the lane finish, i.e., refinishing is required less frequently.

While the primary utility of the basecoat coating compositions of this invention is directed to the coating of bowling lanes, these basecoat compositions are useful for basecoating other wood service floors, e.g., textile factory floors and wood foot traffic lanes. For example, a section of a foot traffic lane of maple wood flooring is basecoated with the Example 1 composition in the same manner as described for basecoating the bowling lane. Two coats of nitrocellulose-based wood floor finish are applied over the basecoat, allowing overnight drying between coats. The floor-finishing lacquer composition is formulated according to Composition 1 appearing in the table of lacquer compositions on page 3 of Hercules Powder Company Technical Report SCL-111 entitled "Nitrocellulose Lacquer for Wood Floor Finishes." The organic film-forming components thereof consist of nitrocellulose plasticized with a 45% oil length castor oil modified glyceryl phthalate alkyd resin and a castor oil modified polyester of ethylene glycol and sebacic acid ("Paraplex" RG-2). The voltage content of this lacquer composition is according to the specifications disclosed on page 2 of the report. Another section of the wood traffic lane is similarly finished without basecoat application. Under the same traffic service of about one month, the composite finish of basecoat layer and two-coat layer of topcoating exhibit a slight advantage over the topcoat finish alone.

Maple bowling lane blocks are finished with the Example 1 basecoat plus two coats of this Hercules lacquer floor finish in the same manner used in finishing the wood foot traffic lane. These finished maple blocks are subjected to ball bump tests simulating action on the bowling lane. This composite finish performs satisfactorily under these tests conditions, but the topcoat is rated as being softer than the topcoats preferred for bowling lane service.

The foregoing examples are intended to illustrate preferred embodiments of the invention and not to limit it in any way. Parts and percentages are by weight unless otherwise indicated.

We claim:

1. A basecoat coating composition comprising 12% to 25% of organic film-forming material consisting essentially of polyvinyl acetate having a viscosity from about 5 to about 150 centipoises and 4 to 20 parts per 100 parts of polyvinyl acetate of nitrocellulose having a viscosity from about ½ second to about 500 seconds, in solution in a balanced volatile organic diluent composition, said diluent composition in 100 parts by weight thereof consisting essentially of the following:

| | Parts |
|---|---|
| (a) fast evaporating active solvent for the nitrocellulose and polyvinyl acetate, the evaporation rate being greater than that of toluol | at least 50 |
| (b) slower evaporating active solvent which is at least a solvent for the polyvinyl acetate and is characterized by an evaporation rate comparable with that of the non-solvent hydrocarbon components | 0 to 20 |
| (c) $C_1$ to $C_4$ alkanol | 0.3 to 25 |
| (d) aromatic hydrocarbon which is a non-solvent for the nitrocellulose and having a rate of evaporation ranging from that of toluol to that substantially comparable with industrial 10° xylol | 20 to 40 | the weight ratio of $$\frac{(d)}{(a)+(b)}$$

being in the range from about 0.25 to about 0.8.

2. A basecoat coating composition of claim 1 wherein said organic diluent is defined by the following composition:

| | Parts |
|---|---|
| (a) said fast evaporating active solvent | 50 to 75 |
| (b) said slower evaporating active solvent | 0 to 10 |
| (c) said $C_1$ to $C_4$ alkanol | 5 to 20 |
| (d) said non-solvent hydrocarbon | 20 to 35 |

3. A basecoat coating composition of claim 1 wherein said non-solvent aromatic hydrocarbon in 100 parts thereof consists essentially of hydrocarbons substantially equivalent to 20 to 40 parts of toluol and 80 to 60 parts of industrial 10° xylol, said hydrocarbons having a boiling range within the limits of 90° C. to 150° C.

4. A basecoat coating composition comprising, as the essential organic film-forming components, 0.7% to 3% of nitrocellulose, characterized by a viscosity from about ½ second to about 100 seconds, and polyvinyl acetate, characterized by a viscosity of 7 to 50 centipoises, in the proportion of 4 to 20 parts of said nitrocellulose per 100 parts by weight of said polyvinyl acetate, the sum of the weights thereof being from 12% to 25%, said nitrocellulose and polyvinyl acetate being in solution in a volatile balanced diluent composition which in 100 parts by weight thereof consists essentially of:

| | Parts |
|---|---|
| (a) fast evaporating active solvent for the nitrocellulose and polyvinyl acetate, the evaporation rate being greater than that of toluol | 50 to 75 |

| | Parts |
|---|---|
| (b) slower evaporating active solvent which is at least a solvent for the polyvinyl acetate and is characterized by an evaporation rate comparable with that of the nonsolvent hydrocarbon components | 0 to 10 |
| (c) $C_1$ to $C_4$ alkanol | 5 to 20 |
| (d) aromatic hydrocarbon which is a nonsolvent for the nitrocellulose and having a rate of evaporation ranging from that of toluol to that substantially comparable with industrial 10° xylol | 20 to 35 |

5. A basecoat coating composition of claim 4 wherein said (a) active solvent consists of solvent substantially equivalent in solvency and evaporation rate to that of methyl ethyl ketone, said (a) alkanol consists essentially of ethanol, and said (d) non-solvent hydrocarbon consists essentially of 20 to 40 parts of toluol and 80 to 60 parts of industrial 10° xylol for a total of 100 parts by weight of said hydrocarbon mixture.

6. A basecoat coating composition of claim 1 which further includes a fluid organic polysiloxane having pendent substituents selected from methyl and phenyl, said polysiloxane being present in the proportion from about 100 parts to about 1500 parts per million parts of said organic film-forming components.

7. A method of providing a bowling lane with an improved finish which comprises applying to the wood surface of the bowling lane a coat of basecoat composition as defined by claim 1, drying said basecoat at ambient temperature, superimposing a plurality of coats of bowling lane nitrocellulose lacquer topcoat composition over the resulting dry basecoat, and drying the topcoats at ambient temperature, said basecoat being applied at a coating weight substantially equivalent to one gallon of basecoat coating composition at about 20% film-forming solids content per lane area of 63 feet by 3.5 feet, and the total coating weight of the topcoat composition being from about 1.5 to about 4 times that of the basecoat.

8. As an article of manufacture, a wood substrate having on an exposed surface thereof a serviceable composite finish consisting essentially of a basecoat contiguous with the wood substrate and a superimposed topcoat layer of a plurality of coats of nitrocellulose topcoat composition, said basecoat consisting essentially of vinyl acetate polymer and nitrocellulose in the proportion of 4 to 20 parts per 100 parts of the vinyl acetate polymer and being the film-forming deposit resulting from drying a coat of basecoat composition, as defined by claim 1, applied at a coating weight substantially equivalent to application of one gallon of the basecoat composition at approximately 20% film-forming content to an area 63 feet by 3.5 feet, said topcoat layer consisting essentially of nitrocellulose and a non-drying fatty oil acid ester plasticizer in the proportion of from about 20 to about 150 parts per 100 parts of the nitrocellulose.

9. An article of manufacture as defined in claim 8 wherein said basecoat consists essentially of said vinyl acetate polymer characterized by a viscosity from about 7 centipoises to about 50 centipoises and the nitrocellulose in combination therewith is characterized by a viscosity from about ½ second to about 100 seconds, and said topcoat layer consists essentially of nitrocellulose characterized by a viscosity in the ¼ to ¾ second range and a plasticizing ester having the fatty acid component thereof consisting essentially of ricinoleic acid.

10. An article of manufacture as defined in claim 9 whereof the plasticizing ester component of said topcoat is a simple ester of ricinoleic acid consisting essentially of a $C_1$ to $C_4$ alkyl acetyl ricinoleate, said plasticizing ester being present in the proportions of from about 20 to about 35 parts per 100 parts of the nitrocellulose.

11. An article of manufacture as defined in claim 8 wherein the composite finish further contains polyorganosiloxane having pendant substituents from the group consisting of methyl and phenyl joined to silicone atoms, which polyorganosiloxane is present in at least the basecoat layer in the proportion from about 100 parts to about 1500 parts per million parts of the organic film-forming components of the coating composition.

12. An article of manufacture as defined in claim 8 wherein the composite finish further contains said polyorganosiloxane in both said basecoat layer and said topcoat layer in the proportion of from about 200 parts to about 1000 parts of the polyorganosiloxane per million parts of the organic film-forming components of the coating composition.

References Cited by the Examiner

UNITED STATES PATENTS

| 2,237,017 | 4/41 | Thinius | 117—73 |
| 2,459,955 | 1/49 | Morrison et al. | 260—17 |
| 3,028,347 | 4/62 | Chevalier | 117—148 |

OTHER REFERENCES

"Non-Convertible Coatings," Paint Technology Manuals, published by Chapman and Hall (London), 1961 (pages 90, 91, and 127 relied on).

Newell and Holtrop: "Coloring Finishing and Painting Wood," published by Ches. A. Bennet Co. (Illinois), 1961, pages 378, 382–386, 393–395.

"Vinyl Resins," Smith, Reinhold Publishing Corporation, New York, pp. 36–43 (1961).

References Cited by the Applicant

UNITED STATES PATENTS 2,734,831   2/56   Larson.

RICHARD D. NEVIUS, *Primary Examiner.*